(12) United States Patent  
Sorel et al.

(10) Patent No.: US 9,202,619 B2  
(45) Date of Patent: Dec. 1, 2015

(54) COILED POWER DEVICE COMPRISING A WINDING OF A FIRST COILING AND A WINDING OF A SECOND COILING WHICH COVER THE SAME PORTION OF A MAGNETIC CORE MEMBER

(71) Applicant: LABINAL POWER SYSTEMS, Blagnac (FR)

(72) Inventors: Herve Sorel, Jouy en Josas (FR); Frederic Bleuzen, Maison Alfort (FR)

(73) Assignee: LABINAL POWER SYSTEMS, Blagnac (FR)

( * ) Notice: Subject to any disclaimer, the term of this patent is extended or adjusted under 35 U.S.C. 154(b) by 0 days.

(21) Appl. No.: 14/422,259

(22) PCT Filed: Aug. 19, 2013

(86) PCT No.: PCT/FR2013/051945  
§ 371 (c)(1),  
(2) Date: Feb. 18, 2015

(87) PCT Pub. No.: WO2014/029943  
PCT Pub. Date: Feb. 27, 2014

(65) Prior Publication Data  
US 2015/0228397 A1    Aug. 13, 2015

(30) Foreign Application Priority Data  
Aug. 23, 2012   (FR) .................................... 12 57947

(51) Int. Cl.  
*H01F 27/24* (2006.01)  
*H01F 27/28* (2006.01)  
*H01F 27/00* (2006.01)  
*H01F 27/38* (2006.01)  
*H02M 7/06* (2006.01)  
*H01F 38/02* (2006.01)

(52) U.S. Cl.  
CPC ............ *H01F 27/2823* (2013.01); *H01F 27/00* (2013.01); *H01F 27/24* (2013.01); *H01F 27/38* (2013.01); *H02M 7/06* (2013.01); *H01F 2038/026* (2013.01)

(58) Field of Classification Search  
CPC .............................................. H01F 27/00–27/35  
USPC ............. 336/65, 83, 180–184, 212, 220–223, 336/192  
See application file for complete search history.

(56) References Cited

U.S. PATENT DOCUMENTS 5,379,207 A    1/1995  Shah  
6,118,362 A    9/2000  Tinkler et al.  
(Continued)

FOREIGN PATENT DOCUMENTS

EP             0 602 926 A1    6/1994

OTHER PUBLICATIONS

International Search Report issued Dec. 18, 2013 in PCT/FR2013/051945 Filed Aug. 19, 2013.

*Primary Examiner* — Tuyen Nguyen  
(74) *Attorney, Agent, or Firm* — Oblon, McClelland, Maier & Neustadt, L.L.P.

(57) ABSTRACT

A coiled power device including a magnetic core including a first leg and a second leg which are parallel to each other, the device including a first coil and a second coil to generate mutual inductance between the coils, the first coil including a first winding of conducting wires around the first leg and a second winding of conducting wires around the second leg, the second coil including at least a third winding of conducting wires around the second leg and a fourth winding of conducting wires around the first leg, the first winding and the fourth winding covering the same portion of the first leg to limit leakage inductance of the coiled power device.

9 Claims, 6 Drawing Sheets

(56) References Cited

U.S. PATENT DOCUMENTS

| | | | |
|---|---|---|---|
| 6,806,790 B2* | 10/2004 | Ji | H03H 3/00 333/118 |
| 2006/0250207 A1* | 11/2006 | Shudarek | H01F 27/24 336/212 |
| 2008/0074911 A1 | 3/2008 | Petter | |
| 2012/0075051 A1 | 3/2012 | Petter et al. | |
| 2013/0010504 A1* | 1/2013 | Xiao | H01F 3/12 363/35 |

* cited by examiner

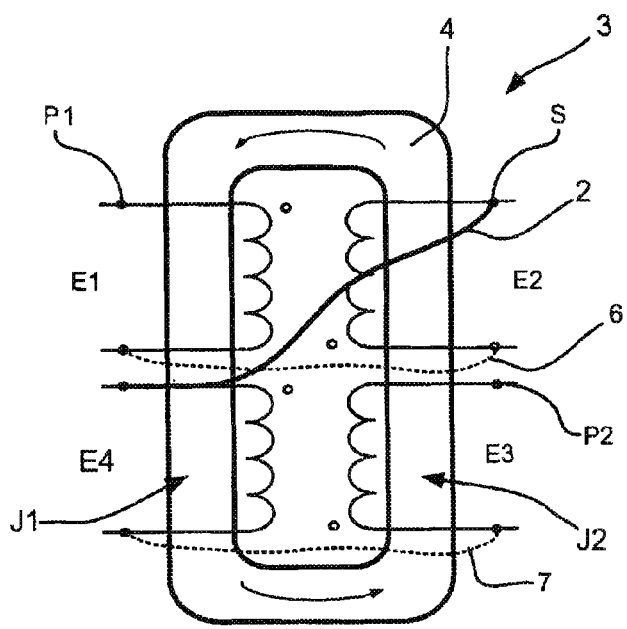
FIGURE 9
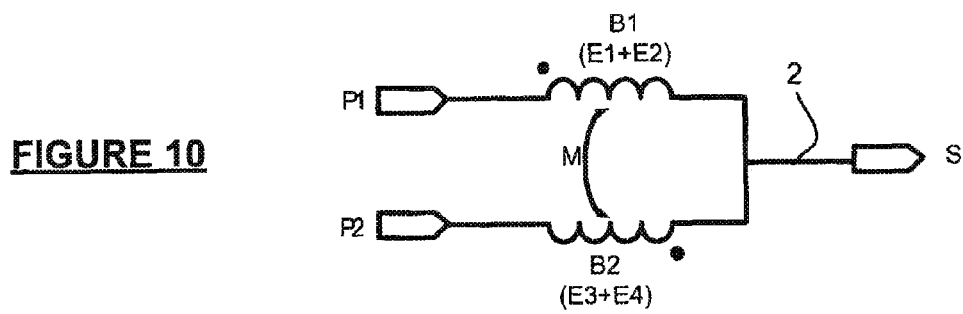
FIGURE 10
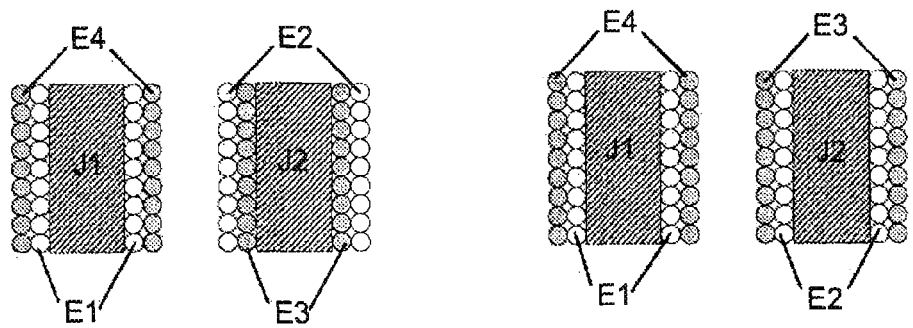
FIGURE 11               FIGURE 12

COILED POWER DEVICE COMPRISING A WINDING OF A FIRST COILING AND A WINDING OF A SECOND COILING WHICH COVER THE SAME PORTION OF A MAGNETIC CORE MEMBER

GENERAL TECHNICAL FIELD AND PRIOR ART

The present invention relates to the field of power electronics and, more particularly, it relates to coupled coils used for example in an interphase reactor or a transformer.

Conventionally, it is known that to convert alternating voltage to direct voltage an AC/DC converter is used. Of these AC/DC converters there exists, for example, with reference to FIG. 1, a diode rectifier 10, referred to as a "twelve-pulse" diode rectifier, which conventionally comprises a transformer 11, two diode bridges 12 and two interphase reactors 13. As a reminder, an interphase reactor 13 allows the mean voltage leaving the diode bridges 12 to be induced as shown in FIG. 1. An AC/DC converter of this type is, for example, used as an uninterruptible power supply to control actuators and thus move the components of an aircraft (flaps, nacelle components).

With reference more particularly to FIGS. 2 to 4, an interphase reactor 13 conventionally comprises two coils B1, B2 which are connected in series and coupled together to generate mutual inductance M as shown in FIG. 2.

The interphase reactor 13 conventionally comprises a magnetic core 4 defining a first leg J1 and a second leg J2 which are parallel to each other. The magnetic core 4 is closed so as to guide a magnetic flow therein as symbolised by the arrows in FIG. 4.

The first coil B1 comprises a first winding of conducting wires, usually made from copper or aluminium, around the first leg J1 of which a first end forms a first input terminal P1. The second coil B2 comprises a second winding of conducting wires around the second leg J2 of which a first end forms a second input terminal P2. The two ends of the coils B1, B2 are conventionally connected together to form an output terminal S. In other words, each leg J1, J2 comprises a winding of a single coil B1, B2 as shown in FIG. 5.

Thus, when two voltages are applied to the input terminals P1, P2 respectively of the interphase reactor 13, the output terminal S induces the mean of the voltages if the coils B1, B2 have the same value.

In practice, each coil B1, B2 is modelled on an ideal inductor L1', L2' in series with a leakage inductance Lf as shown in FIG. 6, the leakage inductance Lf corresponding to the leakage of magnetic field lines.

For example, when an interphase reactor 13 is used in a 10 kW AC/DC converter powered by a 115 VAC network in the aeronautical field, each interphase reactor 13 has an equivalent inductance Le of approximately 7 mH at low frequencies which drops to approximately 100 kHz as shown in FIG. 7. An interphase reactor 13 of this type meets the specifications imposed for this example of an AC/DC converter.

Conventionally, with a range of operation of the interphase reactor 13 between DC and 1 MHz, leakage inductance Lf/2 of a substantially constant value and equal to 120 µH is achieved, as shown in FIG. 8. Above 1 MHz, the leakage inductance Lf starts to resonate with the stray capacitance of the interphase reactor 13, then decreases significantly. In other words, the leakage inductance Lf disappears above 1 MHz which constitutes a threshold frequency Fs.

The leakage inductance Lf that currently exists for an interphase reactor 13 has several disadvantages. First of all, its value at low frequencies is raised (around 120 µH to 1 kHz), which could lead to instability of the AC/DC converter in the case of connection to a DC bus on account of the resonance phenomena created by coupling with the C-Bus capacitances in FIG. 13.

At high frequencies, the leakage inductance Lf allows the injection of current towards the power supply network resulting from EMI (electromagnetic interference) phenomena to be limited. In the present case, this function is ensured up to the threshold frequency Fs of 1 MHz. Beyond this threshold frequency Fs, the leakage inductance Lf disappears, which affects the power supply network, and the AC/DC converter does not comply with the standards for differential mode conducted emissions without additional components.

In order to limit this resonance to low frequencies, it is known that high-value capacitors or resistors should be combined with an interphase reactor 13. Nevertheless, the addition of capacitors significantly increases the overall dimensions of the AC/DC converter, which is prohibited in the aeronautical field, in which weight and size are permanent constraints. The addition of resistors further has the disadvantage of increasing the energy dissipated by Joule heating, which is also undesirable. Finally, the addition of resistors or capacitors increases the manufacturing costs of an AC/DC converter, which is also a disadvantage.

In practice, in order to not be penalised by the leakage inductance Lf, it is common to impose strict usage constraints for AC/DC converters, which is a disadvantage when designing complex electronic systems requiring such converters.

The problem at the root of the invention has been presented in relation to an interphase reactor, but it relates more generally to any coiled device comprising two coupled coils, for example a transformer, for which the negative consequences caused by the leakage inductance are intended to be limited.

BRIEF DESCRIPTION OF THE INVENTION

In order to eliminate at least some of these disadvantages, the invention relates to a coiled power device comprising a magnetic core having at least a first leg and a second leg which are parallel to each other, the device comprising a first coil and a second coil so as to generate mutual inductance between the coils, the device is notable in that:
  the first coil comprises a first winding of conducting wires around the first leg and a second winding of conducting wires around the second leg which is connected to the first winding, the free end of the first winding forming a first input terminal and the free end of the second winding forming an output terminal;
  the second coil comprises a third winding of conducting wires around the second leg and a fourth winding of conducting wires around the first leg which is connected to the third winding, the free end of the third winding forming a second input terminal and the free end of the fourth winding being connected to the output terminal;
  the first winding and the fourth winding cover the same portion of the first leg so as to limit the leakage inductance of the coiled power device.
  and in that each winding comprises at least two layers of turns, the layers of the first winding being alternated with the layers of the fourth winding around the first leg.

Thanks to the distribution of the windings of a single coil around the two legs and thanks to the covering of turns of different coils, the value of the leakage inductance between the coils at low frequencies is significantly reduced. Furthermore, such an arrangement of the windings allows the stray capacitance of the coils to be reduced, which shifts the threshold frequency to high frequencies and limits the current injection phenomenon in the power supply network to which the device is connected.

In addition to the improved performance of the coiled device, the size and the weight thereof are unchanged, which is advantageous. Furthermore, it is not necessary to resort to capacitors or supplementary resistors to absorb the resonance between the leakage inductance and the C-Bus capacitance, thereby limiting the cost.

Preferably, the second winding and the third winding cover the same portion of the second leg so as to limit the leakage inductance of the coiled power device. Thus, the leakage inductance is limited in a comprehensive and balanced manner.

Preferably again, each winding comprises the same number of turns, thereby allowing the turns of different windings to overlap in pairs for optimal limitation of the leakage inductance. Preferably, the conducting wire of each winding has the same diameter and is made from the same material.

According to a preferred aspect of the invention, each winding comprising at least one layer of turns, the first leg comprises a lower layer covered by an upper layer. Thus, the magnetic field leakage lines of one of the layers of turns are recovered by the other layer of turns.

Preferably, the first leg comprises a lower layer of turns of the first winding covered by an upper layer of turns of the fourth winding, and the second leg comprises a lower layer of turns of the third winding covered by an upper layer of turns of the second winding. Thus, each coil comprises a lower layer and an upper layer, which guarantees that the behaviour of the coils will be balanced. Such behaviour is advantageous for usage of the coiled device as an interphase reactor, for example, to average two voltages.

Preferably, the length of the conducting wire of the first coil is equal to the length of the conducting wire of the second coil, so that each coil has the same resistance, which promotes balanced behaviour when used as an interphase reactor.

According to a feature of the invention, each winding comprising at least two layers of turns, the layers of the first winding are alternated with the layers of the fourth winding around the first leg so as to promote interaction between the coils and limit the leakage inductance.

Preferably, the magnetic core is closed and preferably composed of two adjoining C-shaped elements or two adjoining E-shaped elements. Thus, the windings can be distributed over two or three branches of the magnetic core.

The invention also relates to an AC/DC converter comprising at least one device as set out above for performing the function of an interphase reactor.

The invention also relates to a voltage transformer comprising at least one device as set out above.

PRESENTATION OF THE DRAWINGS

The invention will be better understood on reading the following description, given solely by way of example, and with reference to the accompanying drawings, in which:

FIG. 9 is a schematic view of an interphase reactor according to the invention;

FIG. 10 is a functional schematic view of the interphase reactor in FIG. 9;

FIG. 11 is a first schematic view of the windings of turns of an interphase reactor according to the invention;

FIG. 12 is a second schematic view of the windings of turns of an interphase reactor according to the invention;

Figure 1:
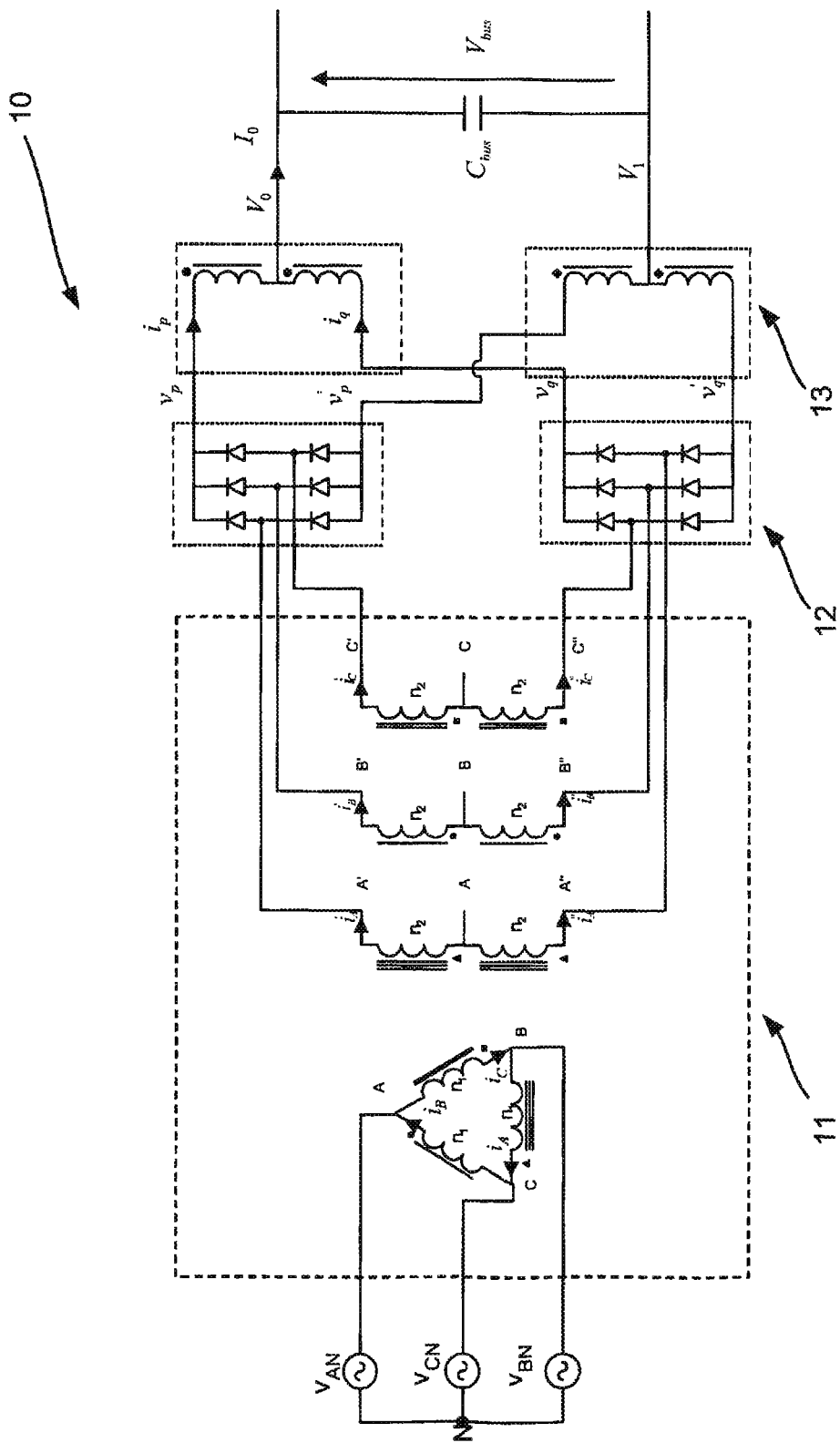
FIG. 1 is a functional schematic view of an AC/DC converter (already discussed)
Figure 2:
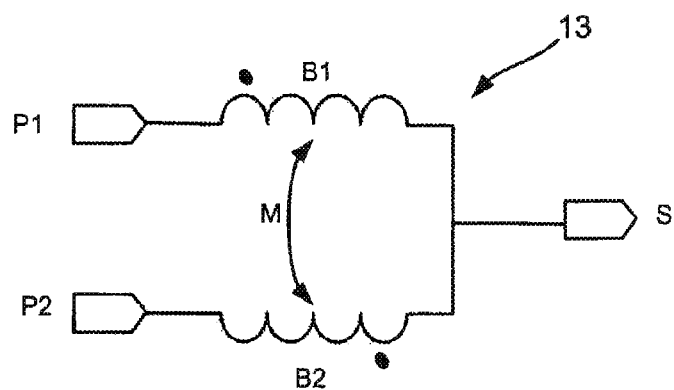
FIG. 2 is a functional schematic view of an interphase reactor (already discussed)
Figure 3:
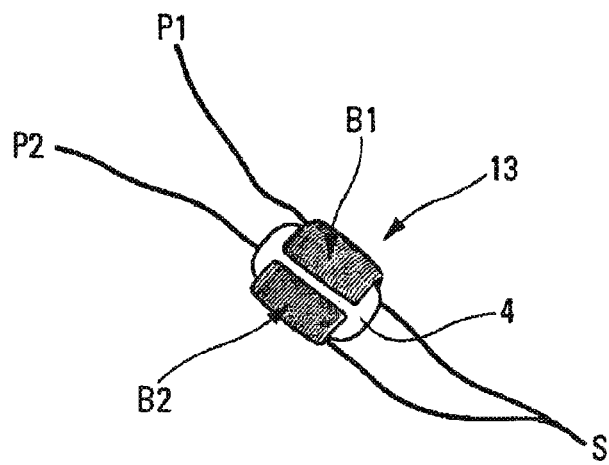
FIG. 3 shows an interphase reactor (already discussed)
Figure 4:
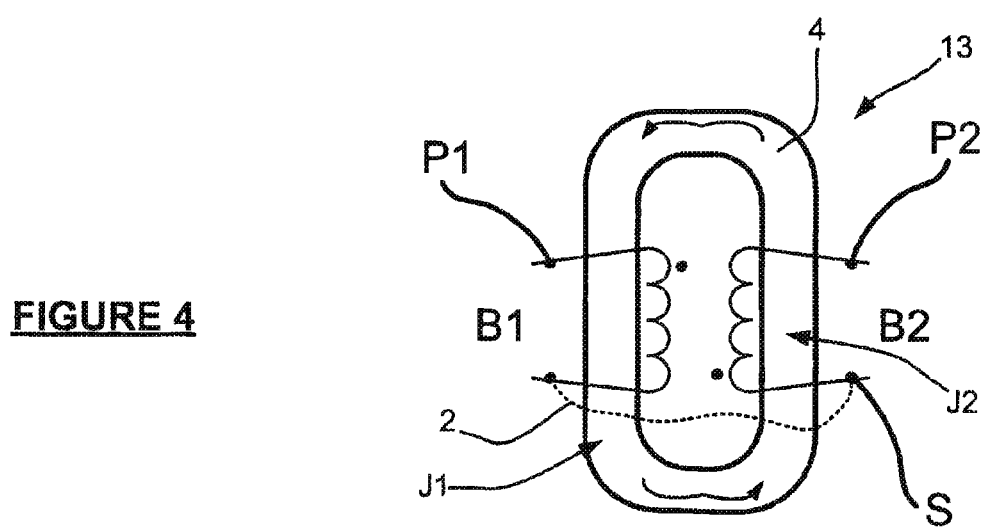
FIG. 4 is a schematic view of an interphase reactor (already discussed)
Figure 5:
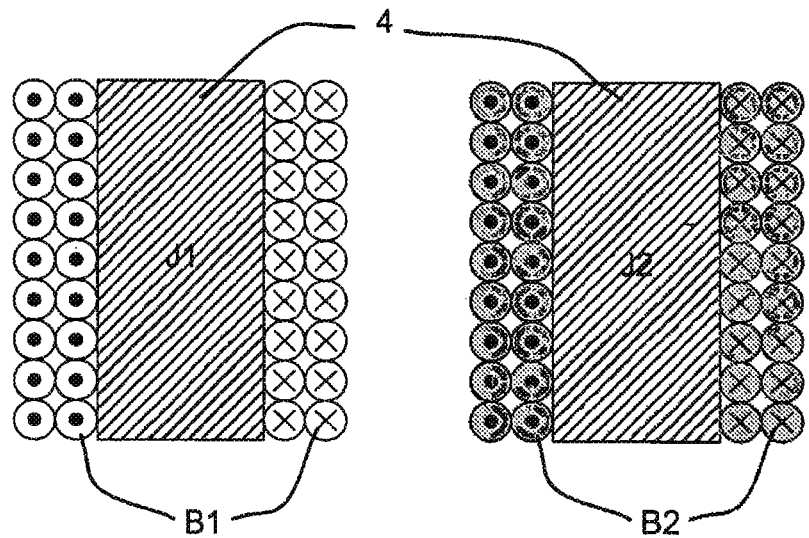
FIG. 5 is a schematic view of the windings of turns of an interphase reactor according to the prior art (already discussed)
Figure 6:
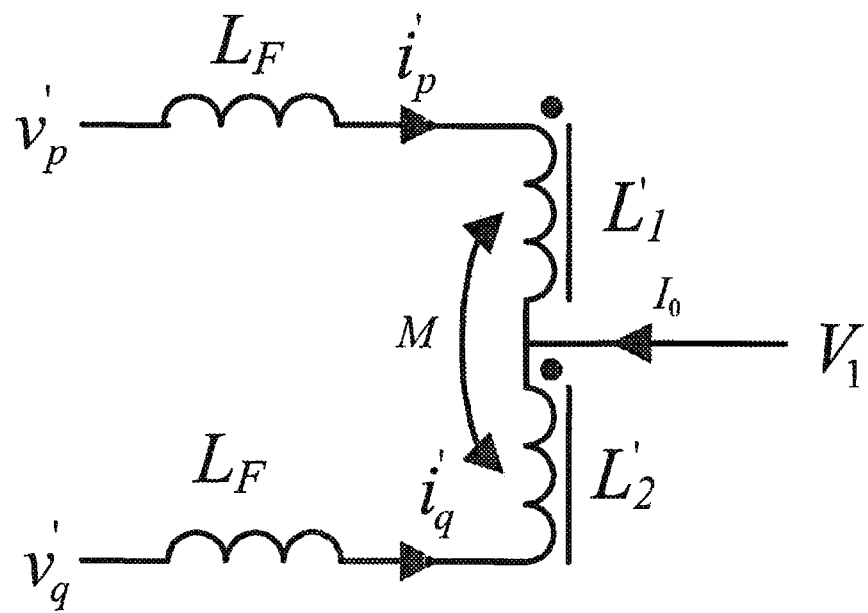
FIG. 6 is a functional schematic view of an interphase reactor with its leakage inductance (already discussed)
Figure 7:
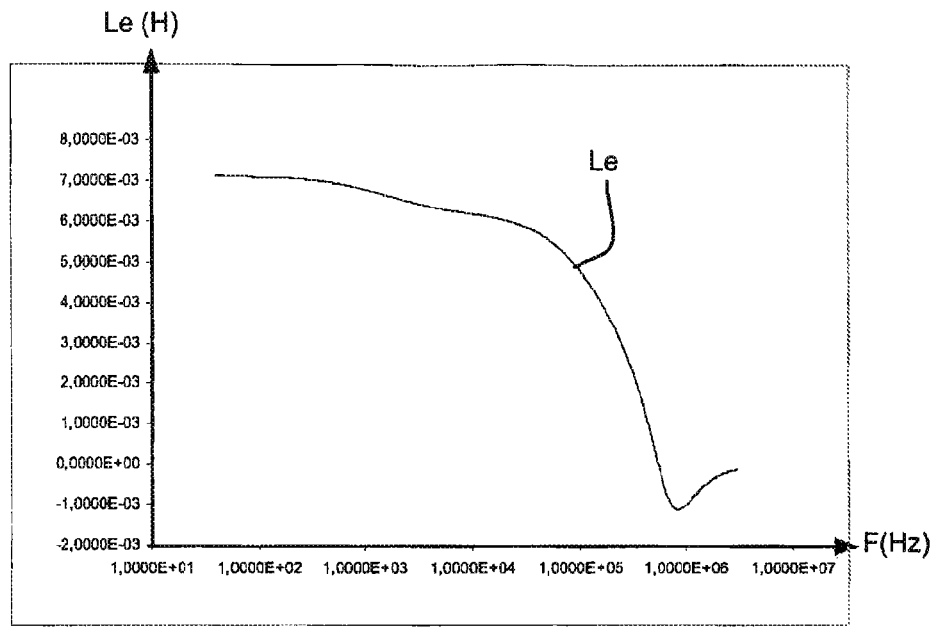
FIG. 7 shows the evolution of the equivalent inductance of the interphase reactor according to the functioning frequency (already discussed)
Figure 8:
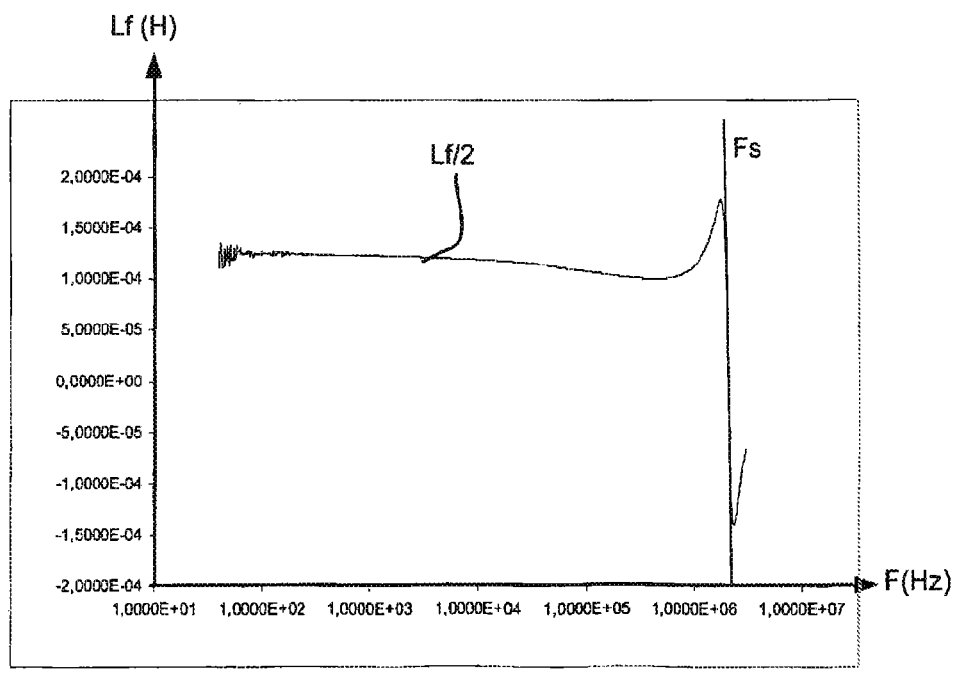
FIG. 8 shows the evolution of the leakage inductance of the interphase reactor according to the functioning frequency (already discussed)
Figure 13:
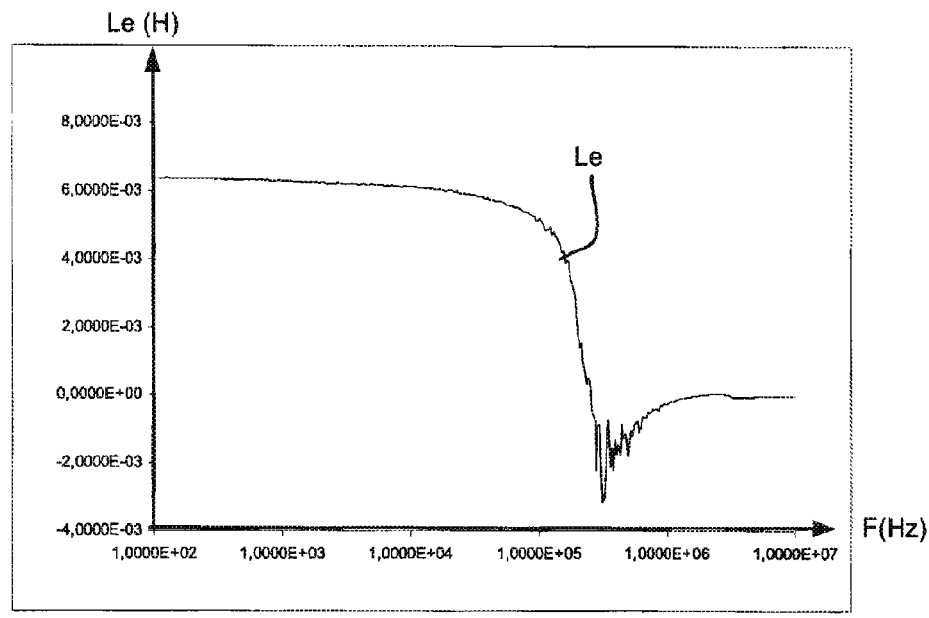
Figure 14:
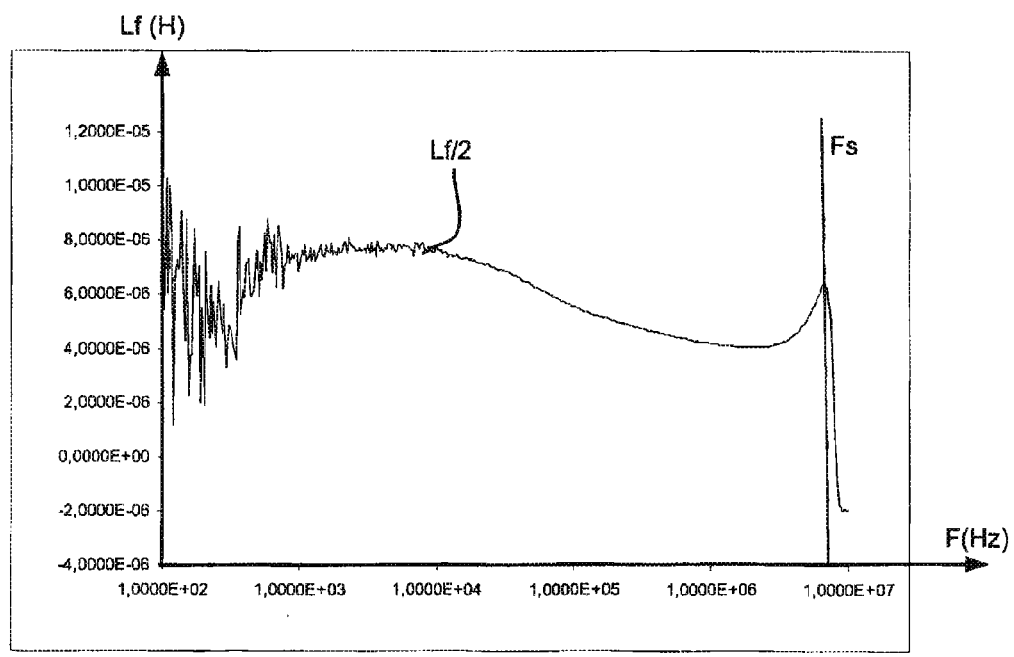

FIG. 13 shows the evolution of the equivalent inductance of an interphase reactor according to the invention as a function of the functioning frequency; and FIG. 14 shows the evolution of the leakage inductance of an interphase reactor according to the invention as a function of the functioning frequency It should be noted that the drawings show the invention in a detailed manner in order to carry out the invention, said drawings can of course be used to better define the invention where necessary.

DESCRIPTION OF ONE OR MORE EMBODIMENTS

The invention will be described for an interphase reactor 3 of an AC/DC converter but it applies to any power device comprising two coupled coils on the same magnetic core, for example, for a transformer or a common mode choke.

In this example, with reference to FIG. 9, the interphase reactor 3 comprises an annular magnetic core 4 defining a first leg J1 and a second leg J2 which are parallel to each other. The magnetic core 4 is closed so as to guide a magnetic flow therein as symbolised by the arrows in FIG. 9. Conventionally, the middle of the two legs J1, J2 contains a region of non-magnetic material, said area being referred to as an "air gap".

According to the prior art, an interphase reactor comprised a first winding of conducting wires, made from copper or aluminium, around a first leg to form a first coil and a second winding of conducting wires around a second leg to form a second coil. In other words, each coil was formed around only one leg of the magnetic core.

By contrast, according to the invention, each coil is distributed over the legs of the magnetic core. In other words, each leg of the magnetic core holds windings of turns of the first coil B1 and windings of turns of the second coil B2, thereby allowing said windings to interact with one another and to improve the magnetic coupling, that is to say, to limit the leakage inductance Lf of the interphase reactor 3.

A practical embodiment will be described with reference to FIGS. 9 to 11.

With reference to FIG. 9, the interphase reactor 3 comprises a first coil B1 which comprises a first winding E1 of conducting wires around the first leg J1 and a second winding E2 of conducting wires around the second leg J2 which is connected to the first winding E1, the free end of the first winding E1 forming a first input terminal P1 and the free end of the second winding E2 forming an output terminal S.

The interphase reactor 3 also comprises a second coil B2 which comprises at least a third winding E3 of conducting wires around the second leg J2 and a fourth winding E4 of conducting wires around the first leg J1 which is connected to the third winding E3, the free end of the third winding E3 forming a second input terminal P2 and the free end of the fourth winding E4 being connected to the output terminal S as shown in FIG. 9.

In this example, the first winding E1 and the second winding E2 are connected by an added bonding wire 6, but it goes without saying that the windings E1, E2 could be made up of the same single conducting wire. Similarly, the third winding E3 and the fourth winding E4 are connected by an added bonding wire 7, but it goes without saying that the windings E3, E4 could be made up of the same single conducting wire.

Finally, in this example, the second winding E2 and the fourth winding E4 are connected by an added bonding wire 2 forming the output terminal S of the interphase reactor 3.

Thus, the interphase reactor 3 in FIG. 9 comprises a first coil B1 formed by the first winding E1 and the second winding E2 which are distributed over the two legs J1, J2 of the magnetic core 4 and a second coil B2 formed by the third winding E3 and the fourth winding E4 which are distributed over the two legs J1, J2 of the magnetic core 4. A block diagram of the interphase reactor 3 thus obtained is shown in FIG. 10.

According to the invention, with reference to FIG. 11 showing a longitudinal section of the branches and the windings, each leg J1, J2 comprises overlapping turns of different windings so as to limit the leakage of magnetic field lines and to reduce the leakage inductance Lf.

Still with reference to FIG. 11, the first leg J1 is covered firstly by the turns of the first winding E1 which are covered by the turns of the fourth winding E4. Since the windings E1, E4 belong to different coils B1, B2, the magnetic field lines of one of the windings are recovered by the other winding, thereby limiting leakage. Similarly to the first leg J1, the second leg J2 is covered firstly by the turns of the third winding E3 which are covered by the turns of the second winding E2. Since the windings E3, E2 belong to different coils B1, B2, the magnetic leakage is low.

With reference to FIG. 11, the first winding E1 and the fourth winding E4 cover the same portion of the first leg J1, whereas the second winding E2 and the third winding E3 cover the same portion of the second leg E2.

As shown in FIG. 11, the turns of the windings of the same leg of the magnetic core 4 overlap one another. Subsequently, the turns of the winding closest to the magnetic core 4 are referred to as the lower layer. Likewise, the turns of the winding furthest from the magnetic core 4 are referred to as the upper layer.

In this example, legs J1, J2 comprising only two layers of turns have been shown, but it goes without saying that more than two layers could be arranged on each leg J1, J2 of the magnetic core 4.

Preferably, each layer of turns completely covers the layer of turns located underneath said layer so as to limit any magnetic loss.

Preferably, each layer of turns comprises the same number of turns. Furthermore, the diameter of the conducting wire of each winding is constant so that each winding has the same electrical resistance, which is advantageous in order to form, inter alia, a balanced interphase reactor 3. By way of example, the diameter of the conducting wire is approximately 1 mm in diameter.

The order of the layers of turns may be advantageously reversed depending on the manufacturing process and requirements. Thus, as shown in FIG. 12, the second leg J2 is covered firstly by the turns of the second winding E2 which are covered by the turns of the third winding E3. In this case, since the windings E3 and E4 of the second coil B2 are on the outside, it is advantageous for the diameter of the conducting wire used to make the first coil B1 to be less than that used to make the second coil B2 so as to balance the resistance of coils B1 and B2.

According to one aspect of the invention, the same layer of turns may comprise turns of different windings which are, preferably, alternated in order to limit the leakage inductance.

When the first leg J1 of the magnetic core 4 comprises more than two layers, each coil comprises the same number of layers. For example, if the first leg J1 comprises four layers, two layers of turns belong to the first winding E1 and two layers of turns belong to the fourth winding E4. The layers may be alternated or grouped in pairs depending on the manufacturing process or requirements.

A magnetic core 4 comprising two parallel legs J1, J2 has been described, but it goes without saying that the invention applies to a magnetic core 4 comprising more than two parallel legs, for example three legs, arranged in a single plane or not. According to this latter hypothesis, the windings of the first coil and of the second coil are then distributed over the three legs.

A magnetic core 4 comprising two parallel legs is preferably produced by combining two half-cores, each being in the shape of a C. A magnetic core 4 comprising three parallel legs is preferably produced by combining two half-cores, each being in the shape of an E.

With reference to FIG. 13, an interphase reactor 3 according to the invention has an equivalent inductance Le of approximately 6 mH at low frequencies which drops to approximately 100 kHz, which corresponds to the general properties of an interphase reactor according to the prior art and therefore meets the specifications for an AC/DC convertor suitable for use in the aeronautical field.

Very advantageously, the leakage inductance Lf/2 for an interphase reactor 3 according to the invention is equal to 6 µH for a range of operation between DC and 1 MHz as shown in FIG. 14. The value of the leakage inductance Lf at low frequencies is low (around 6 µH to 1 kHz), that is to say, 20 times lower than for an interphase reactor according to the prior art. As a result, the AC/DC converter is very stable when connected to a DC bus.

Moreover, the value of the leakage inductance Lf does not fall until a threshold frequency Fs of approximately 10 MHz at high frequencies is reached, that is to say, at a threshold frequency Fs that is 10 times higher than in the prior art. As a result, the supply network is protected over a larger range of operation, thereby limiting any risk of injection of current into the power supply network as a result of EMI (electromagnetic interference) phenomena.

In addition to the improved performance of the interphase reactor 3, the size and weight thereof are identical to those in the prior art, which is very advantageous for an application in the aeronautical field.

By means of the invention, it is also possible to obtain more powerful transformers or AC/DC converters which also have fewer usage constraints.

The invention claimed is:
1. A coiled power device comprising:
a magnetic core comprising at least a first leg and a second leg which are parallel to each other;
a first coil and a second coil to generate mutual inductance between the coils;
wherein the first coil comprises at least a first winding of conducting wires around the first leg and at least a second winding of conducting wires around the second leg which is connected to the first winding, a free end of the first winding forming a first input terminal and a free end of the second winding forming an output terminal;

the second coil comprises at least a third winding of conducting wires around the second leg and at least a fourth winding of conducting wires around the first leg which is connected to the third winding, a free end of the third winding forming a second input terminal and the free end of the fourth winding being connected to the output terminal;

the first winding and the fourth winding cover a same portion of the first leg to limit leakage inductance of the coiled power device; and each winding comprises at least two layers of turns, the layers of the first winding being alternated with the layers of the fourth winding on the first leg.

2. A device according to claim 1, wherein the second winding and the third winding cover a same portion of the second leg to limit leakage inductance of the coiled power device.

3. A device according to either claim 1, wherein each winding comprises a same number of turns.

4. A device according to claim 1, wherein the conducting wire of each winding has a same diameter.

5. A device according to claim 1, wherein each winding comprising at least one layer of turns, the first leg comprises a lower layer covered by an upper layer.

6. A device according to claim 5, wherein the first leg comprises a lower layer of turns of the first winding covered by an upper layer of turns of the fourth winding, and the second leg comprises a lower layer of turns of the third winding covered by an upper layer of turns of the second winding.

7. A device according to claim 1, wherein a length of the conducting wire of the first coil is equal to a length of the conducting wire of the second coil.

8. A device according to claim 1, wherein the magnetic core is closed or is composed of two adjoining C-shaped elements or two adjoining E-shaped elements.

9. An AC/DC converter comprising at least one device according to claim 1 for performing a function of an interphase reactor.

* * * * *